(12) United States Patent
Kalish

(10) Patent No.: US 12,518,795 B2
(45) Date of Patent: Jan. 6, 2026

(54) SYSTEM AND METHOD TO CUSTOMIZING VIDEO

(71) Applicant: Idomoo LTD, Raanana (IL)

(72) Inventor: Danny Kalish, Raanana (IL)

(73) Assignee: Idomoo LTD, Raanana (IL)

(*) Notice: Subject to any disclaimer, the term of this patent is extended or adjusted under 35 U.S.C. 154(b) by 16 days.

(21) Appl. No.: 17/382,765

(22) Filed: Jul. 22, 2021

(65) Prior Publication Data

US 2022/0028425 A1 Jan. 27, 2022

Related U.S. Application Data

(60) Provisional application No. 63/054,983, filed on Jul. 22, 2020.

(51) Int. Cl.
*G11B 27/034* (2006.01)
*G06F 16/78* (2019.01)
*G06F 16/783* (2019.01)
*G11B 27/06* (2006.01)

(52) U.S. Cl.
CPC .......... *G11B 27/034* (2013.01); *G06F 16/783* (2019.01); *G06F 16/7867* (2019.01); *G11B 27/06* (2013.01)

(58) Field of Classification Search
None
See application file for complete search history.

(56) References Cited

U.S. PATENT DOCUMENTS

| | | | | |
|---|---|---|---|---|
| 9,286,938 | B1* | 3/2016 | Tseytlin | G11B 27/031 |
| 10,165,325 | B2* | 12/2018 | Chen | H04N 21/4542 |
| 10,404,923 | B1* | 9/2019 | Pena | H04N 5/783 |
| 10,523,899 | B2* | 12/2019 | Segal | G06F 3/0482 |
| 10,733,230 | B2* | 8/2020 | Jo | G06V 20/47 |
| 11,017,362 | B2* | 5/2021 | Spitz | G06Q 20/0855 |

(Continued)

FOREIGN PATENT DOCUMENTS

| | | |
|---|---|---|
| JP | 2002335519 A | 11/2002 |
| JP | 2007282048 A | 10/2007 |

(Continued)

*Primary Examiner* — Gelek W Topgyal
(74) *Attorney, Agent, or Firm* — FisherBroyles, LLP; Roger L. Browdy; James E. Mrose

(57) ABSTRACT

The present invention provides method for customizing video, said method comprising the steps of:
determine original video, metadata which includes at least partial information to generate the new video file and parameter which effect/customize video content—in association to creating a new basic standard video file, wherein the partial information include at least an ID or link of the basic video original;

upon opening the video the by a client player reading the metadata;

checking metadata predefined conditions for playing the video as is;

playing video as is in case the video initial condition are met;

in case initial condition require user intervention prompting user to update the video rabbling user to input change in customization parameters data;

in case user selected option of update providing the user option of update/edit the video Enabling user to input change in customization parameters data.

19 Claims, 17 Drawing Sheets

(56) References Cited

U.S. PATENT DOCUMENTS

| | | | | |
|---|---|---|---|---|
| 2007/0250901 A1* | 10/2007 | McIntire | .......... | H04N 21/47815 |
| | | | | 348/E7.071 |
| 2007/0288309 A1* | 12/2007 | Haberman | ......... | H04N 21/2541 |
| | | | | 705/14.1 |
| 2008/0285939 A1* | 11/2008 | Baum | ................. | G11B 27/034 |
| | | | | 386/281 |
| 2009/0313546 A1* | 12/2009 | Katpelly | .......... | H04N 21/25891 |
| | | | | 715/723 |
| 2011/0131493 A1* | 6/2011 | Dahl | ................... | G11B 27/034 |
| | | | | 715/716 |
| 2014/0189727 A1* | 7/2014 | Chen | .................... | H04N 21/485 |
| | | | | 725/28 |
| 2015/0134661 A1* | 5/2015 | Circlaeys | ............. | G06F 16/438 |
| | | | | 707/752 |
| 2016/0173960 A1* | 6/2016 | Snibbe | ............... | H04N 21/2353 |
| | | | | 386/285 |
| 2019/0089929 A1* | 3/2019 | Segal | ................ | H04N 21/4788 |
| 2019/0246149 A1* | 8/2019 | Reza | ................. | H04N 21/2347 |
| 2019/0304157 A1* | 10/2019 | Amer | ..................... | G06V 40/23 |
| 2020/0359076 A1* | 11/2020 | Patel | .................... | H04N 21/812 |

FOREIGN PATENT DOCUMENTS

| | | | | |
|---|---|---|---|---|
| JP | 2009522939 A | | 6/2009 | |
| WO | WO-2019005178 A1 * | | 1/2019 | ....... H04N 21/44204 |

* cited by examiner

200A checkup module based on user input /web based optionally by default play the video Check if metadata exists, if no play the video, optionally check unique for reterving metadata 210A

If yes Read metadata from video file or associated info file 220A

Determining if to play the basic movie by checking meta data if any editing/refresh is required validation (expiration date) data if no play 230A

If yes send metadata instruction to designated server 240A

Optionally on reading meta data providing indication for the user or Prompting user to input interface for adding instruction parameters 250A

Optionally Receiving user input data 260A

Sending user input data with metadata of instruction code to video generation service 270A

Receiving back new or updated video movie 275A

Automatically Playing updated new movie 280A

Figure 4A

| | |
|---|---|
| checkup module based on user input client player application | 200B |
| optionally by default play the video | |
| Check if network available/server connected, if not play the video from client device storage | 210B |
| Check if metadata exists, if not play the video | 220B |
| If no Read metadata from video file or associated info file | 230B |
| Determining if to play the basic movie by checking meta data if any editing/refresh is required validation (expiration date) data if no play the video | 240B |
| If yes send meta data instruction to designated server | 250B |
| Optionally on reading meta data providing indication for the user or Prompting user to input interface for adding instruction parameters | 260B |
| Optionally Receiving user input data | 270B |
| Sending user input data with metadata of instruction code to video generating service | 275B |
| Receiving back, updated/new video on local storage of client device | 280B |
| Automatically Playing updated/new movie | 290A |

Figure 4B

Video version management
900

Save new created video as succeeding video version of the original video, create hierarchical tree association between original video and successive video created based on the original video, where each version is associated to the user ID
910 maintaining associations between original video or version video by organizing the metadata in hierarchal tree structure maintaining correlation between the different version of the video file
920 the original video and each new version are registered with unique ID which authenticate author/creator or editor of the video the unique ID may be using blockchain technology 9
930

The ID which authenticate author/creator or editor of the video the unique ID may be using blockchain technology may store unique ID of the "father" of the video hierarchical tree
940

Optionally Override the original video with the new version
950

Optionally creating last non editable version
960

Fig. 6

```
"original_request_id" : "2777.1590486705.420.410.350427"
,"end_point_url" : "
https://liv.idomoo.com/prod/3747/0000/232202e0a30uy15f1jt2e7
c282tr3hes37via.mp4"
,[ ] : "data"
,"key" : "Drop down with open text"
,"display_type" : "dropdown_list_with_open_text"
,[ ] : "display_values"
,"display_value" : "Have a nice day"
,"val_to_send" : "Have a nice day"
},{
"display_value" : "Enjoy the day"
,"val_to_send" : "Enjoy the day"
},{
"display_value" : "today is your day"
,"val_to_send" : "today is your day"
[
},{
,"key" : "color picker"
,"display_type" : "color_picker"
,[ ] : "display_values"
,[ ] : "display_defult"
,"(display_value" : "rgb(0,0,90"
"(val_to_send" : "rgb(0,0,90"
},{
,"key" : "Drop down IMAGE"
,"display_type" : "dropdown_list_image"
,[ ] : "display_values"
,"(display_value" : "rgb(251,204,209"
"(val_to_send" : "rgb(251,204,209"
"item_type" : "color"
},{
"
```

Fig. 9A

```
"display_value" : "   original_request_id" : "2777.1590486705.420.410.350427"
,"https://www.kidsmathgamesonline.com/images/pictures/shapes/square.jpg"
"val_to_send" : "
","https://www.kidsmathgamesonline.com/images/pictures/shapes/square.jpg"
,"item_type" : "image"
},{
"display_value" : "https://clipartstation.com/wp-"
"content/uploads/2018/10/square-shapes-clipart-4.jpg
"val_to_send" : "https://clipartstation.com/wp-content/uploads/2018/10/square-"
,"shapes-clipart-4.jpg
"item_type" : "image"
},{
"display_value" : "http://www.aljanh.net/data/archive/img/1556902389.jpeg"
,"val_to_send" : "http://www.aljanh.net/data/archive/img/1556902389.jpeg"
"item_type" : "image"
}]
},{
"key" : "Upload Audio"
,"display_type" : "upload_audio"
,[ ]:"display_values"
,"display_value" : "Soundtrack to hear"
,val_to_send" : "http://commondatastorage.googleapis.com/codeskulptor-"
"assets/sounddogs/soundtrack.mp3
}]
},{
,"enable" : true
,"accountId" : 1004"
,"docType" : "storyboard_moo"
,"storyboardId" : "33847"
} ,"lastModified"
,timestamp" : 1583317313"
[ datetime" : [ 2020, 3, 4, 10, 21, 53"
}
```

Fig. 9B

SYSTEM AND METHOD TO CUSTOMIZING VIDEO

BACKGROUND

Technical Field

The present invention relates generally to generation of customized, parameter-based videos for based on user interaction.

SUMMARY

The present invention provides a method for generating video variation to an original video, implemented by one or more processors operatively coupled to a non-transitory computer readable storage device, on which are stored modules of instruction code that when executed cause the one or more processors to perform the steps of:
  creating original video file, associated with metadata which includes at least partial information to generate a new variation video file including at least one parameter configured change or add to the video content;
  upon opening the video file by a client player reading said associated metadata;
  enabling a user to change/select at least one predefined customization parameters data;
  sending video at least partial information with user selections to remote server;
  generating a video version according at least partial information generation instructions and using user selection at the remote server;
  sending back the generated video version to user player; and playing received generated video version at the user player.

According to some embodiments of the present invention further comprising the steps of checking metadata predefined conditions for playing the video as is, said initial condition including at least one of existence of at least one parameter, validation of the video file, network availability;

According to some embodiments of the present invention the method further comprising the steps of: playing video as is in case the video initial conditions are met.

According to some embodiments of the present invention the video information is embedded as part of the meta data of the video file.

According to some embodiments of the present invention the video information is recorded as separate file in association with the created video, further comprising the step of retrieving video generating instruction based on video ID, optionally full instructions, optionally information from external information sources(.

According to some embodiments of the present invention the partial video information a network link to the basic video instruction.

According to some embodiments of the present invention the video information includes partial customization instruction.

According to some embodiments of the present invention the video information includes full instructions for generating the basic video.

According to some embodiments of the present invention the metadata further comprises customization parameters from external information sources including at least one of: context parameters, parameter data originated from pre-defined sources associated with the basic video According to some embodiments of the present invention the link is an HTTP request including customization parameters data, wherein generation of the video is further based on said of the customization parameters data.

According to some embodiments of the present invention the method further comprising the steps of saving at least one new created video as succeeding video version of the original video and creating hierarchical tree association between original video and successive video created based on the original video, where each version is associated to the user ID.

According to some embodiments of the present invention the method further comprising the steps maintaining associations between original video or version video by organizing the metadata in hierarchal tree structure maintaining correlation between the different version of the video file.

According to some embodiments of the present invention the original video and each new version are registered with unique ID which authenticate author/creator or editor of the video the unique ID may be using blockchain technology.

The present invention provides a system for customizing video, implemented by one or more processors operatively coupled to a non-transitory computer readable storage device, which comprise the module of:
  video generation tool for creating/determining original video associated with meta data which includes video at least partial instruction code to generate the new version video file, said at least partial information including at least one parameter configured change or add to the video content;
  video player configured to reading the metadata upon opening the video file by a client and prompting a user to update/edit the video enabling user to input change in parameters data;
  wherein, the player sends at least partial information with user selections to remote server;
    a remote server generating new version video according generation instructions and user input data parameter, wherein the remote server sends back the new version video to user player;
    wherein, the player sends video instructions to the remote server;
    wherein, the player automatically plays the received new video version;

According to some embodiments of the present invention the video generation module further checking metadata predefined conditions for playing the video as is, said initial condition including at least one of existence of metadata, validation of the video file, network availability and playing video as is in case the video initial condition are met;

According to some embodiments of the present invention the video information is embedded as part of the meta data of the video file.

According to some embodiments of the present invention the video information is recorded as separate file in association with the created video.

According to some embodiments of the present invention the partial video information a network link to the basic video instruction.

According to some embodiments of the present invention the video information includes partial customization instruction According to some embodiments of the present invention the video information includes full instructions for generating the basic video.

According to some embodiments of the present invention the metadata further comprises customization parameters from external information sources including at least one of: context parameters, parameter data originated from pre-defined sources associated with the basic video.

According to some embodiments of the present invention wherein the link is an HTTP request including customization parameters data, wherein generation of the video is further based on said of the customization parameters data.

The present invention provides method for customizing video, said method comprising the steps of:

create/determine original video, metadata which includes at least partial information to generate the new video file and parameter which effect/customize video content—in association to creating a new basic standard video file, wherein the partial information include at least an ID or link of the basic video original;

upon opening the video file by a client player reading the metadata;

checking metadata predefined conditions for playing the video as is, said initial condition including at least one of existence of metadata, validation of the video file, network availability;

playing video as is in case the video initial condition are met;

in case initial condition require user intervention or user initiating request prompting user to update/edit the video Enabling user to input change in customization parameters data;

in case user selected option of update providing the user option of update/edit the video Enabling user to input change in customization parameters data;

in case of non-complaint initial conditions sending video information to the remote server and generating/updating video according generation instructions and at the server optionally using user input at the remote server and sending back the updated video to user player;

playing received generated/updated video at the player.

According to some embodiments of the present invention the video information is embedded as part of the meta data of the video file.

According to some embodiments of the present invention the video information is recorded as separate file in association with the created video.

According to some embodiments of the present invention the partial video information a network link to the basic video instruction.

According to some embodiments of the present invention the video information includes partial customization instruction According to some embodiments of the present invention the video information includes full instructions for generating the basic video.

According to some embodiments of the present invention the metadata further comprise customization parameters from external information sources including at least one of: context parameters, parameter data originated from pre-defined sources associated with the basic video According to some embodiments of the present invention the link is an HTTP request including customization parameters data, wherein generation of the video is further based on said of the customization parameters data.

The present invention provides a system for customizing video, said system comprised of:

video generation tool for creating/determining video, meta data which includes video at least partial instruction code to generate the new video file and parameter which effect/customize video content—in association to creating a new basic standard video file, wherein the partial instruction include at least an ID of the basic video original instruction;

video player configured to reading the metadata upon opening the video file by a client, checking metadata predefined conditions for playing the video as is, said initial condition including at least one of existence of metadata, validation of the video file, network availability and playing video as is in case the video initial condition are met;

Wherein in case initial condition require user intervention or user initiating request: prompting user to update/edit the video Enabling user to input change in parameters data;

Wherein in case user selected option of update providing the user option of update/edit the video Enabling user to input change in parameters data;

Wherein in case of non-complaint initial conditions sending video instructions to the remote server and generating/updating video according generation instructions and at the server optionally using user input at the remote server and sending back to user player;

According to some embodiments of the present invention, the video information is embedded as part of the meta data of the video file.

According to some embodiments of the present invention the video information is recorded as separate file in association with the created video.

According to some embodiments of the present invention the partial video information a network link to the basic video instruction.

According to some embodiments of the present invention the video information includes partial customization instruction According to some embodiments of the present invention the video information includes full instructions for generating the basic video.

According to some embodiments of the present invention metadata further comprise customization parameters from external information sources including at least one of: context parameters, parameter data originated from pre-defined sources associated with the basic video According to some embodiments of the present invention the link is an HTTP request including customization parameters data, wherein generation of the video is further based on said of the customization parameters data.

BRIEF DESCRIPTION OF THE SCHEMATICS

The present invention will be more readily understood from the detailed description of embodiments thereof made in conjunction with the accompanying drawings of which:

FIG. 4A is a flowchart depicting video playing module checkup processing for web-based video, according to some embodiments of the invention.

FIG. 4B is a flowchart depicting video playing module checkup processing for client based video, according to some embodiments of the invention.

Figure 5A:
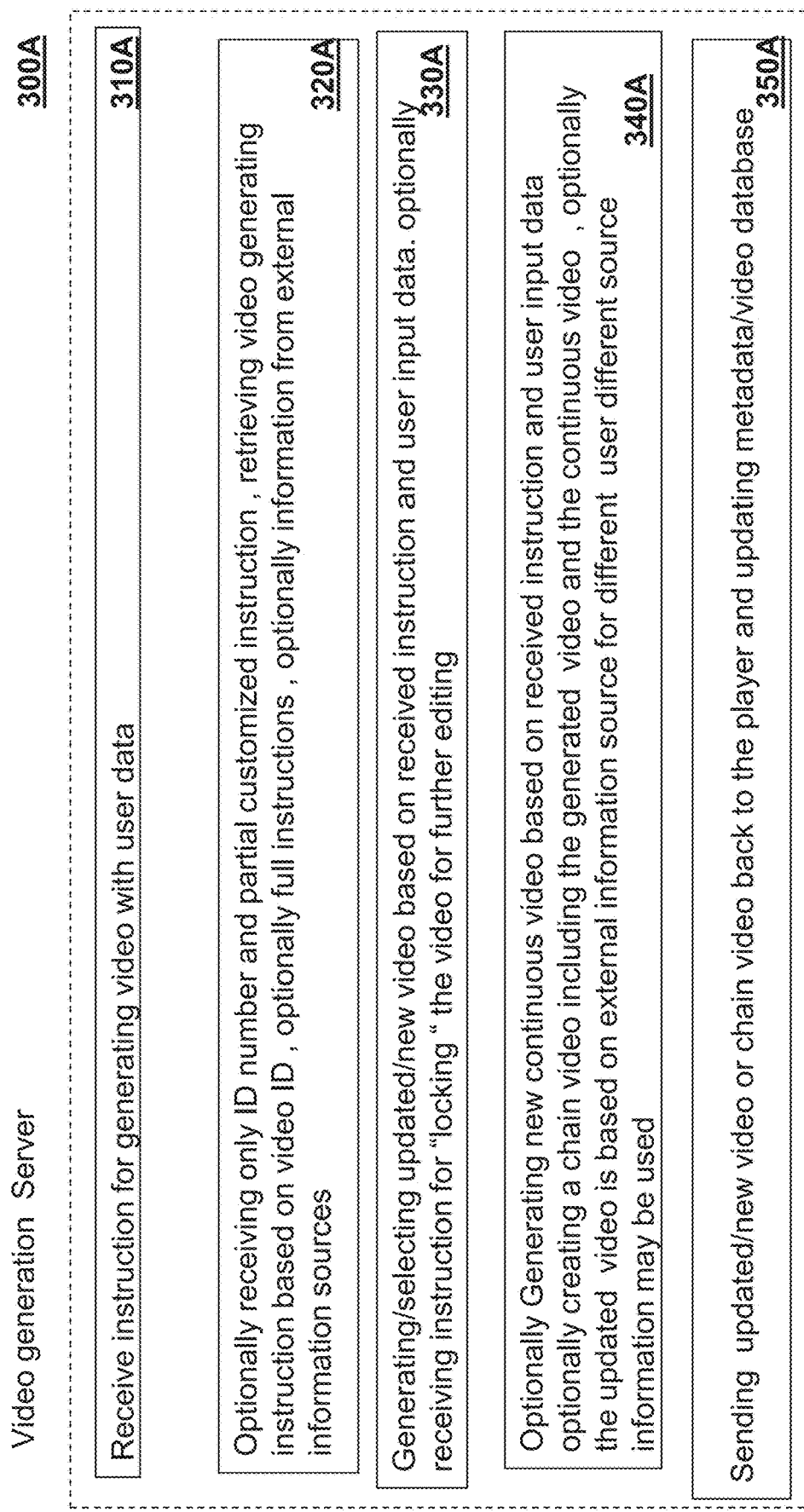

FIG. 5A presents a flowchart, depicting the video generating server, according to some embodiments of the invention. 15

Figure 5B:
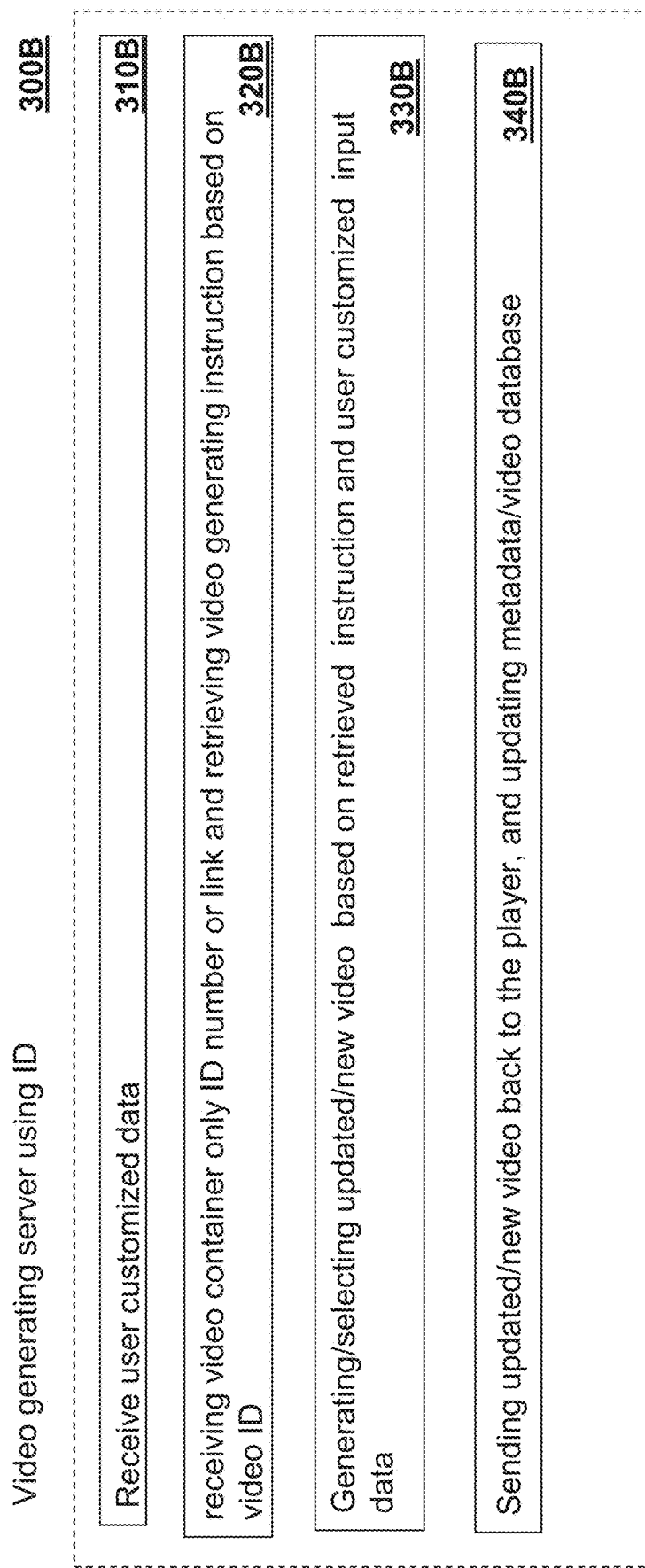

FIG. 5B presents a flowchart, depicting the video generating server, according to some embodiments of the invention.

Figure 5C:
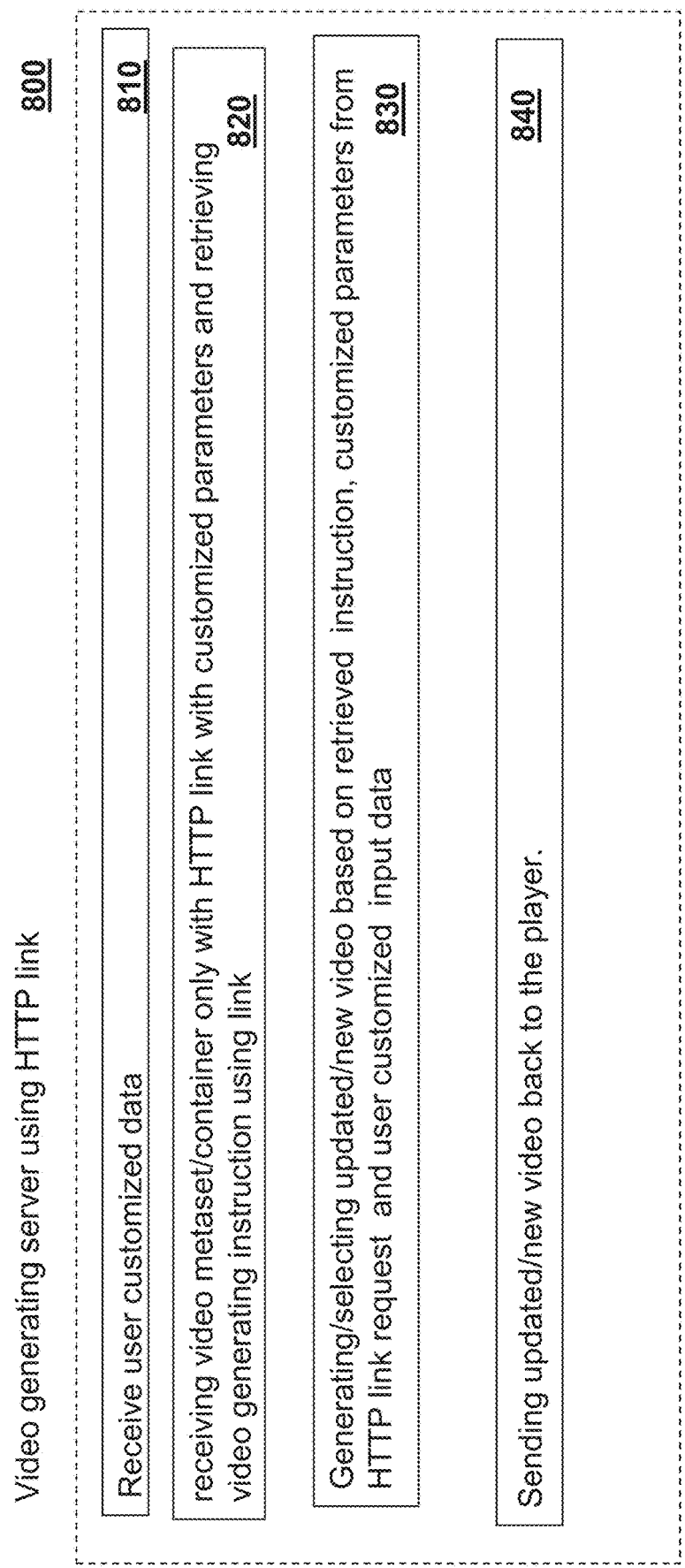

FIG. 5C presents a flowchart, depicting the video generating server, according to some embodiments of the invention.

Figure 7:
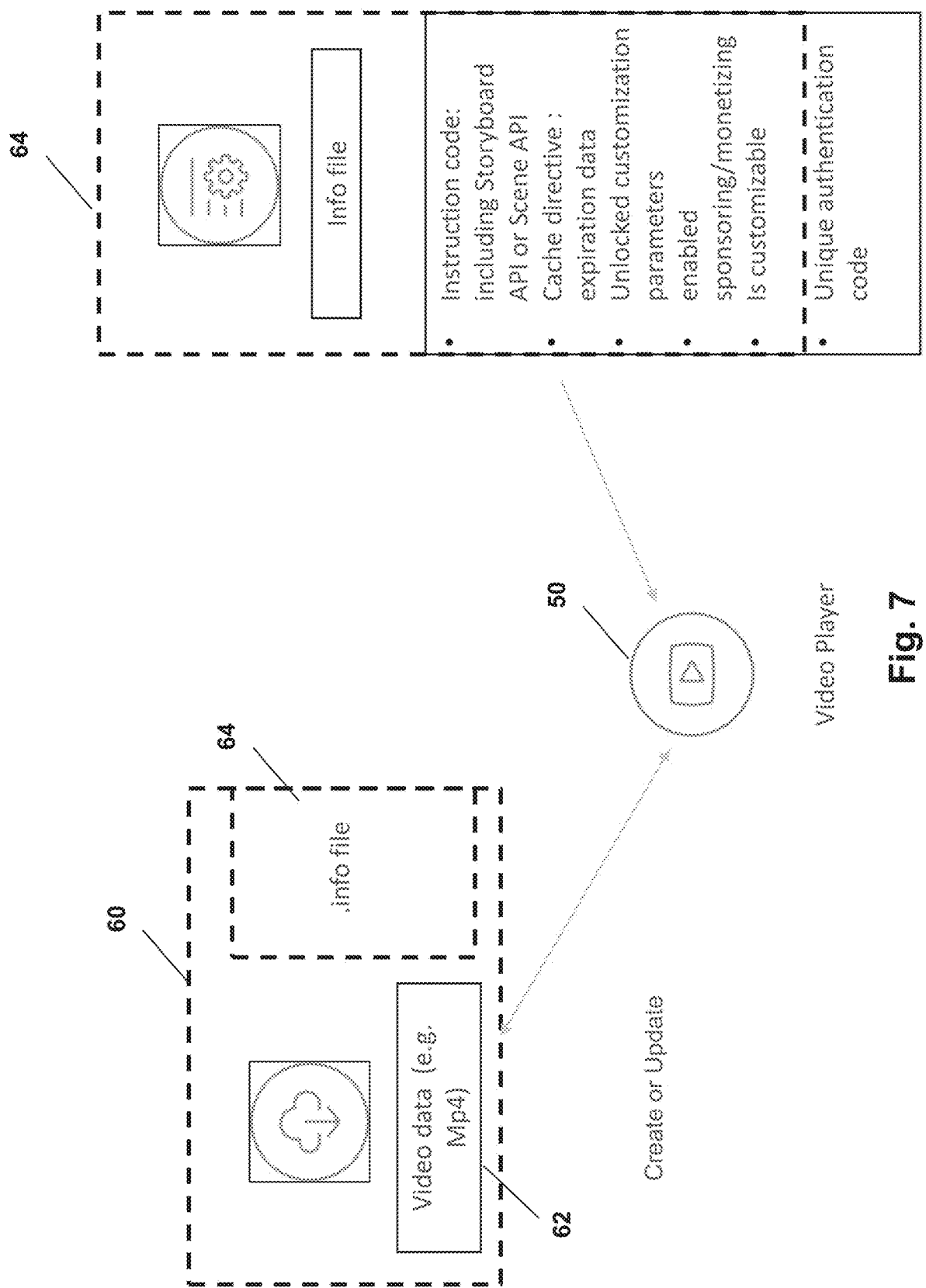

FIG. 6 presents a flowchart, depicting the video management module, according to some embodiments of the invention FIG. 7 illustrates an example of video file and Info file according to some embodiments of the present invention.

Figure 8:
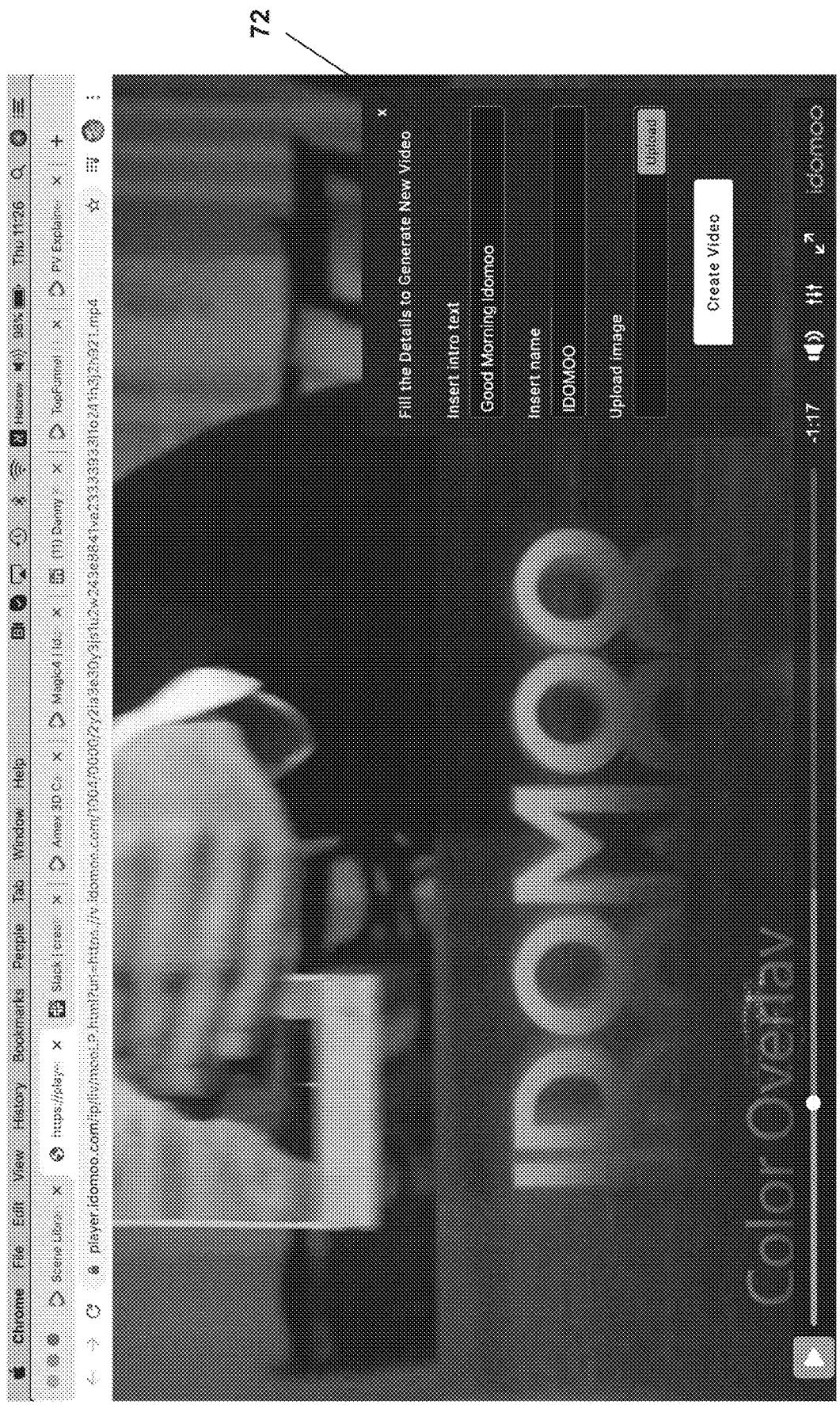

FIG. 8 illustrates an example of video screenshot and user interface according to some embodiments of the present invention.

FIG. 9A 9B illustrates an example metadata including instruction code and or parameters according to some embodiments of the present invention

DETAILED DESCRIPTION OF THE VARIOUS MODULES

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a list of definitions of the terms used throughout this application, adjoined by their properties and examples.

Definition:

Video instruction metadata contains data that are essential for drawing blueprints for the scene: including at least one of the following:

A composition of what elements to draw and where/when/how they should be drawn, transformed, animated, etc.).

The metadata may include text, images, and video, how they all move and appear throughout time together and with respect to each other.

The metadata include data of the 'scene graph' of the scene (i.e. how the scene is to be drawn from all of its elements, and throughout time).

To draw the movie at a specific frame, we first tell the "uber" scene graph to "SetFrame( )" which tells all of the individual components to configure themselves for the desired frame (i.e. set transformations (positions & rotation) values, any animatable values, to their expected values for that frame).

Then, second, we finally call Render( ), which takes all of the data in its current configuration, and draws the picture to a piece of memory called a 'frame buffer.'

Figure 1A:
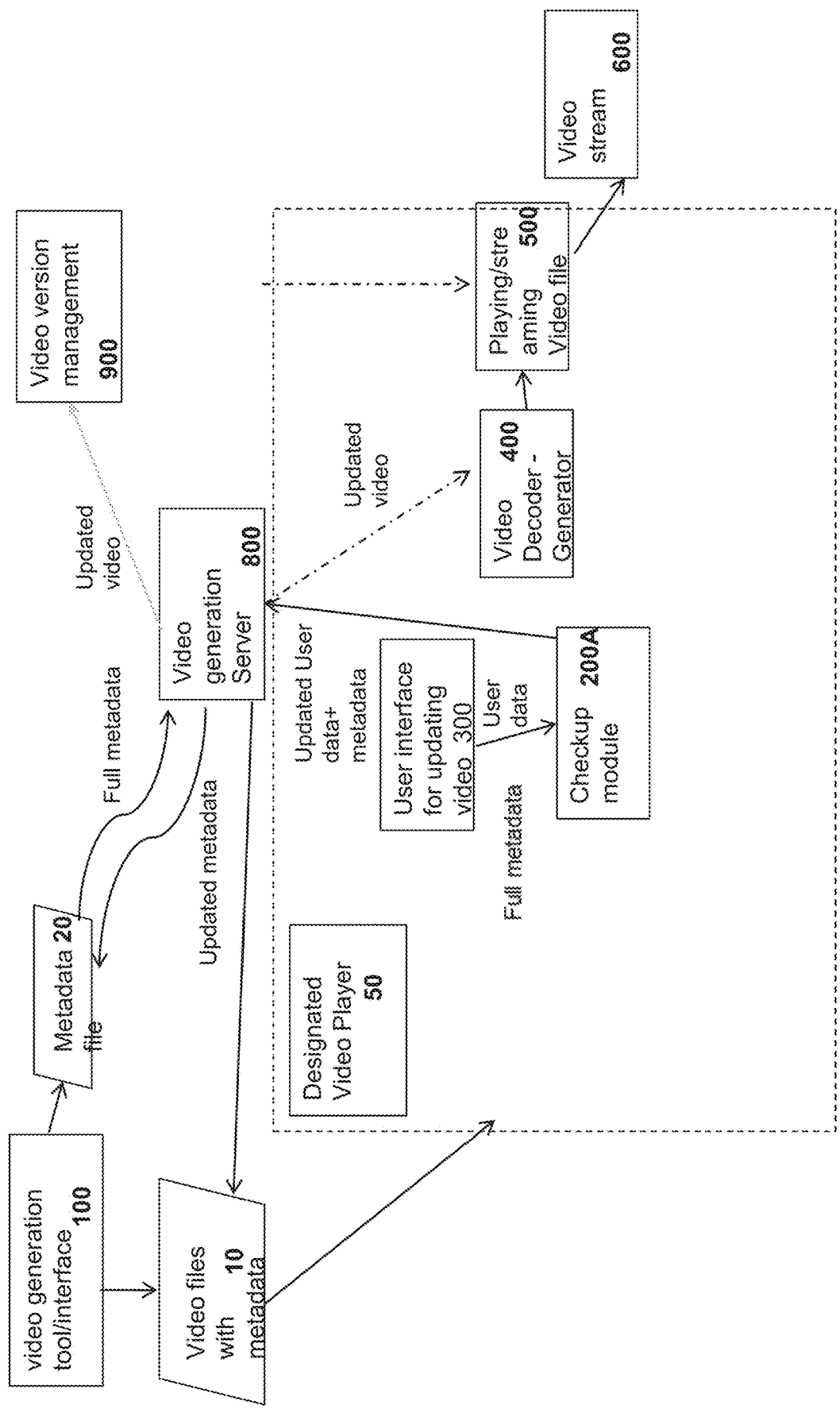
FIG. 1A is a block diagram, depicting the components and the environment of the video management system, according to some embodiments of the invention.

FIG. 1 is a block diagram, depicting the components and the environment of the video management environment system, according to some embodiments of the invention. The video generation tool 100 is configured to produce a basic/original video in known formats, such as MP4, and meta data including identification and/or partial or full instructions for generating the video and/or version of the video, such as JSON description file and customization parameters. The metadata can be saved as part of the standard meta data of known video format such as Mp4. Optionally the meta data can be saved is a separate info file 20, which is associated with the basic original video file. The separate file 20 may be saved at remote server, optionally the video generation server 300. The sperate info file may include ID of the basic file or communication link to the basic file which is saved at remote server, such as the video generation server 300.

The designated video player 50, is configured to play the basic original video in incase conditions appearing meta data are met, otherwise the player sends the meta data which may include ID, link or instruction for generating the video with customized/personalized parameter to the video generation server 300. The player receives back the customized/updated new version video and play automatically this updated/new version video. This process may involve user interaction to customize the video.

According to some embodiments of the present invention the system further comprises management module for managing the version of videos.

According to some embodiments of the present invention it is possible to generate continuous video for the basic video, the continuous video may include the same and or different images, audio, video parts and customized/personalized parameters. The continuous video is added to basic original video creating new longer video, a chain video.

Figure 1B:
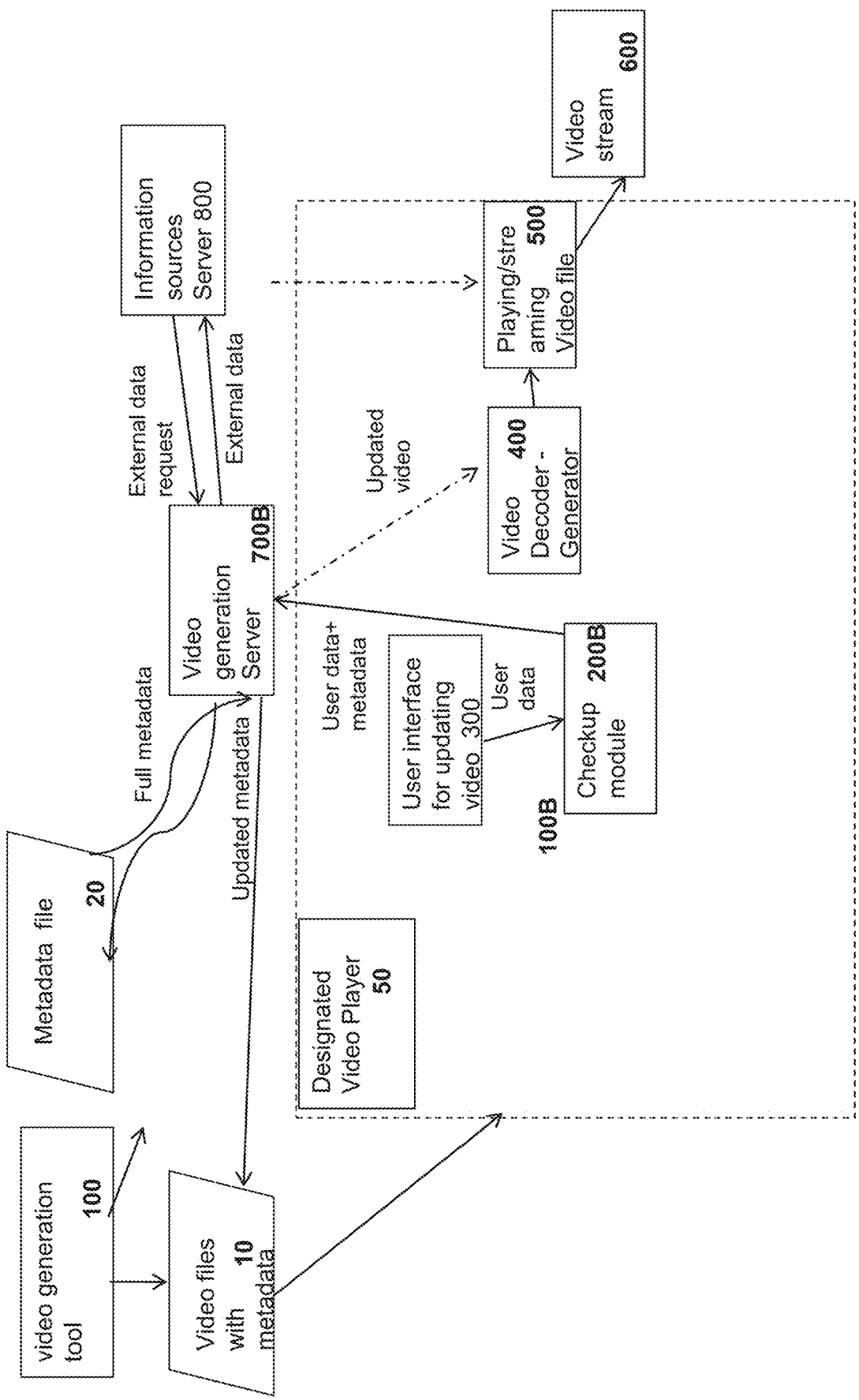
FIG. 1B is a block diagram, depicting the components and the environment of the video management system, according to some embodiments of the invention.

FIG. 1B is a block diagram, depicting the components and the environment of the video management system, according to some embodiments of the invention.

According to this embodiment the video generating server, queries pre-defined information source 800 for pre-defined customization parameter defined in the metadata, in response to query request, an external information source, using a designated API, returns the required customized parameter data. The external information source may be for example news sites, organization databases etc.

Figure 1C:
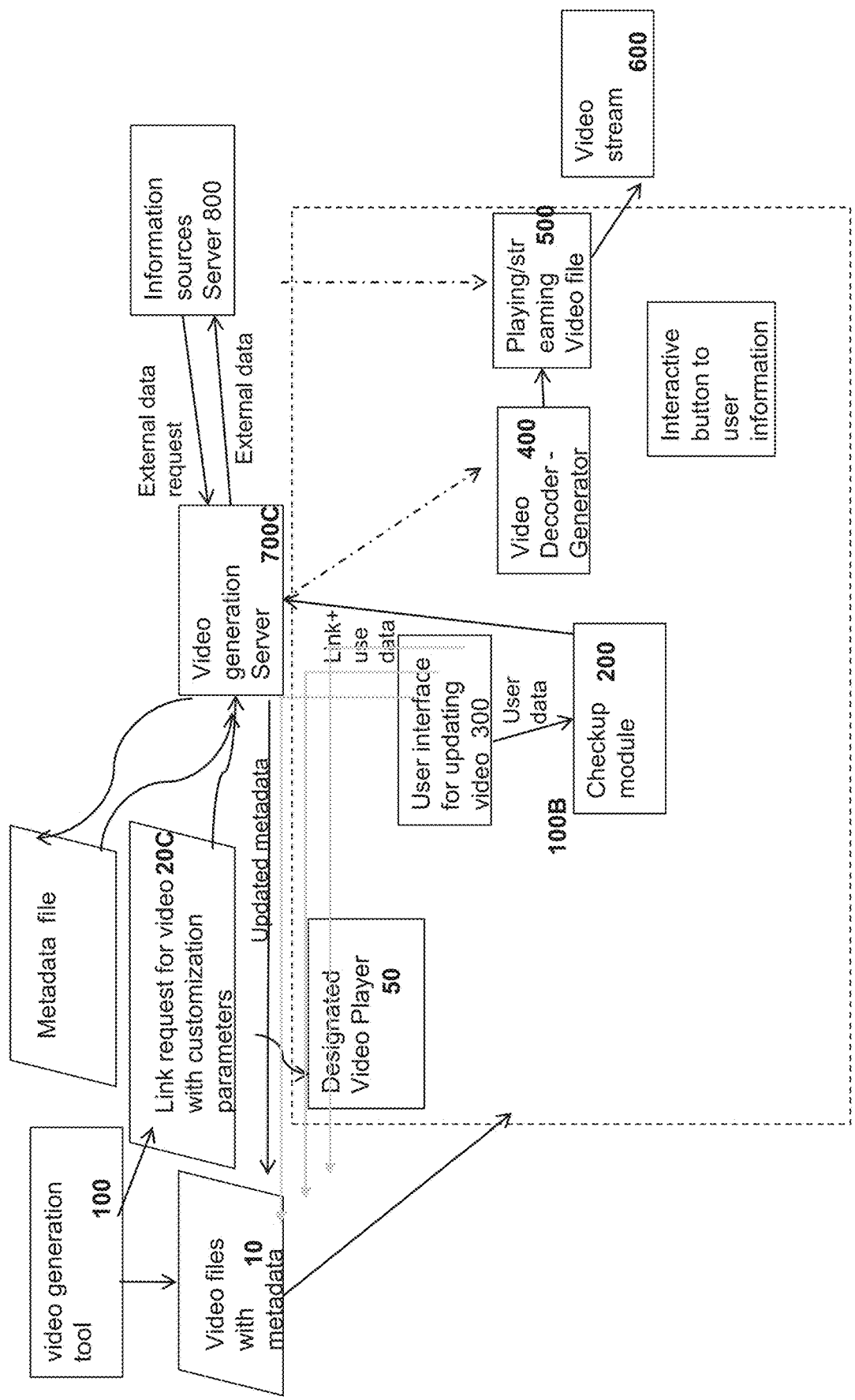
FIG. 1C is a block diagram, depicting the components and the environment of the video management system, according to some embodiments of the invention.

FIG. 1C is a block diagram, depicting the components and the environment of the video management system, according to some embodiments of the invention.

According to this embodiment, the link of the video is an HTTP request which include meta data including at least one customized parameter data, which is sent by the player to the video generating server, to be used for the generation of the new version video.

Figure 2A:
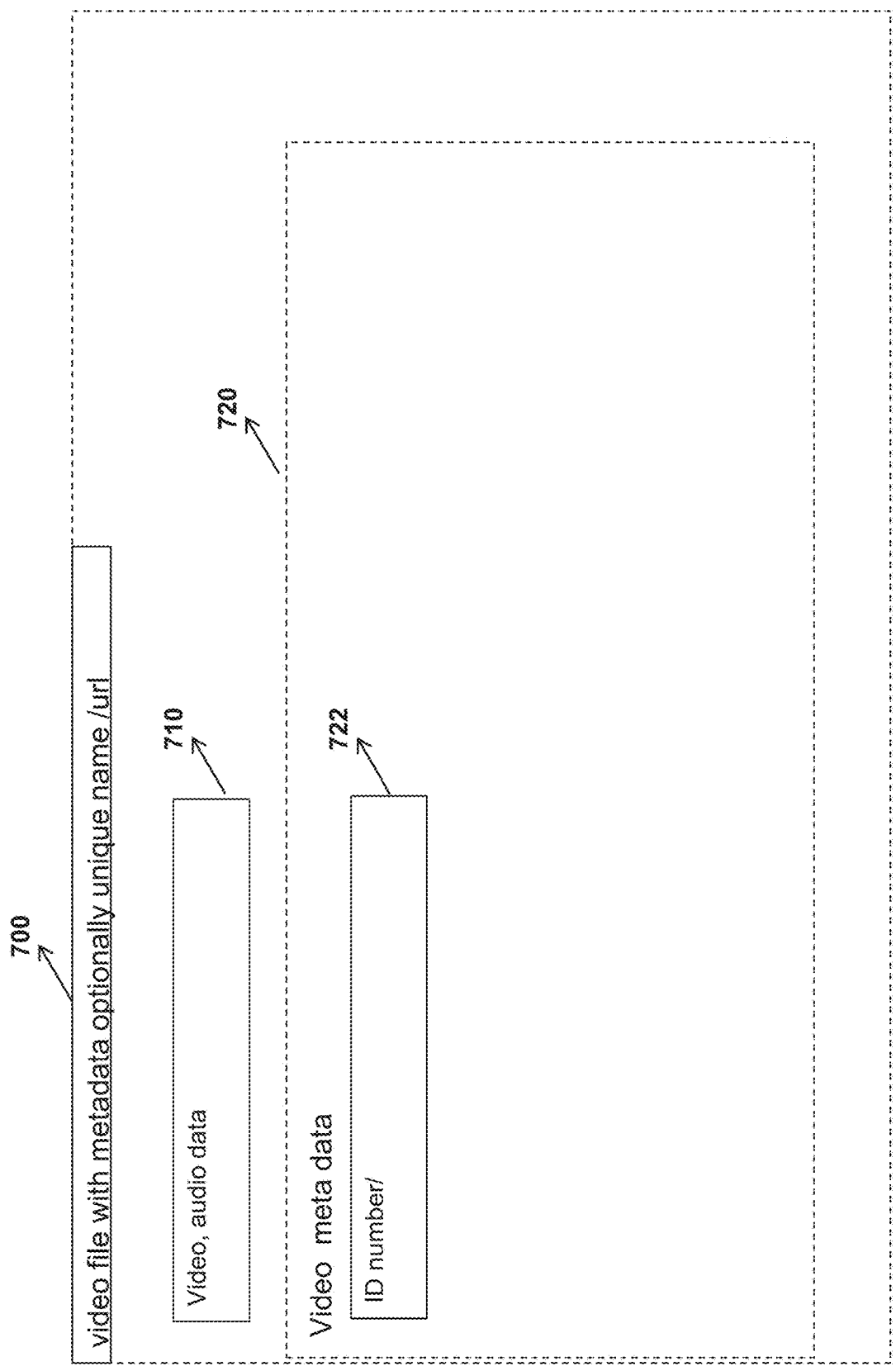
FIG. 2A is a block diagram depicting the video file format information structure, according to one embodiment of the invention.

FIG. 2A is a block diagram depicting the video file format information structure, according to one embodiment of the invention.

According to this embodiment, the video file format of digital media container 700 is comprised of video or audio data 710 and meta data 720. The meta data comprises only video ID or a link to the video 722, where metadata file is associated with the video ID or link.

Figure 2B:
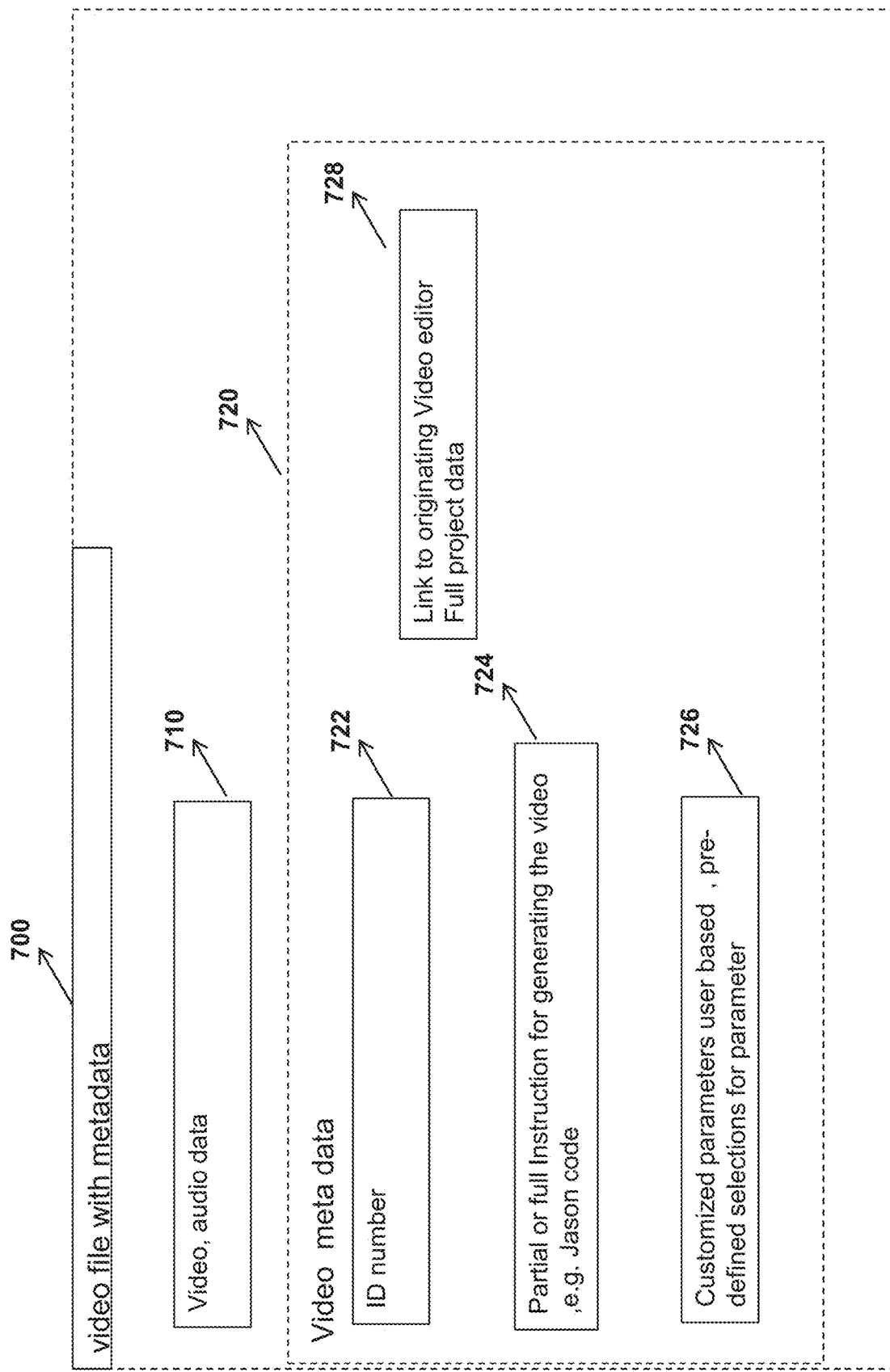
FIG. 2B is a block diagram depicting the video file format information structure, according to one embodiment of the invention.

FIG. 2B is a block diagram depicting the video file format information structure, according to one embodiment of the invention.

The video file format of digital media container 700 is comprised of video or audio data 710 and meta data 720. The meta data comprises at least video ID or a link 722 and/or optionally partial or full video generation instructions 724 and/or customized parameters 726. Optionally including Link to originating Video editor of full project data 728.

Figure 2C:
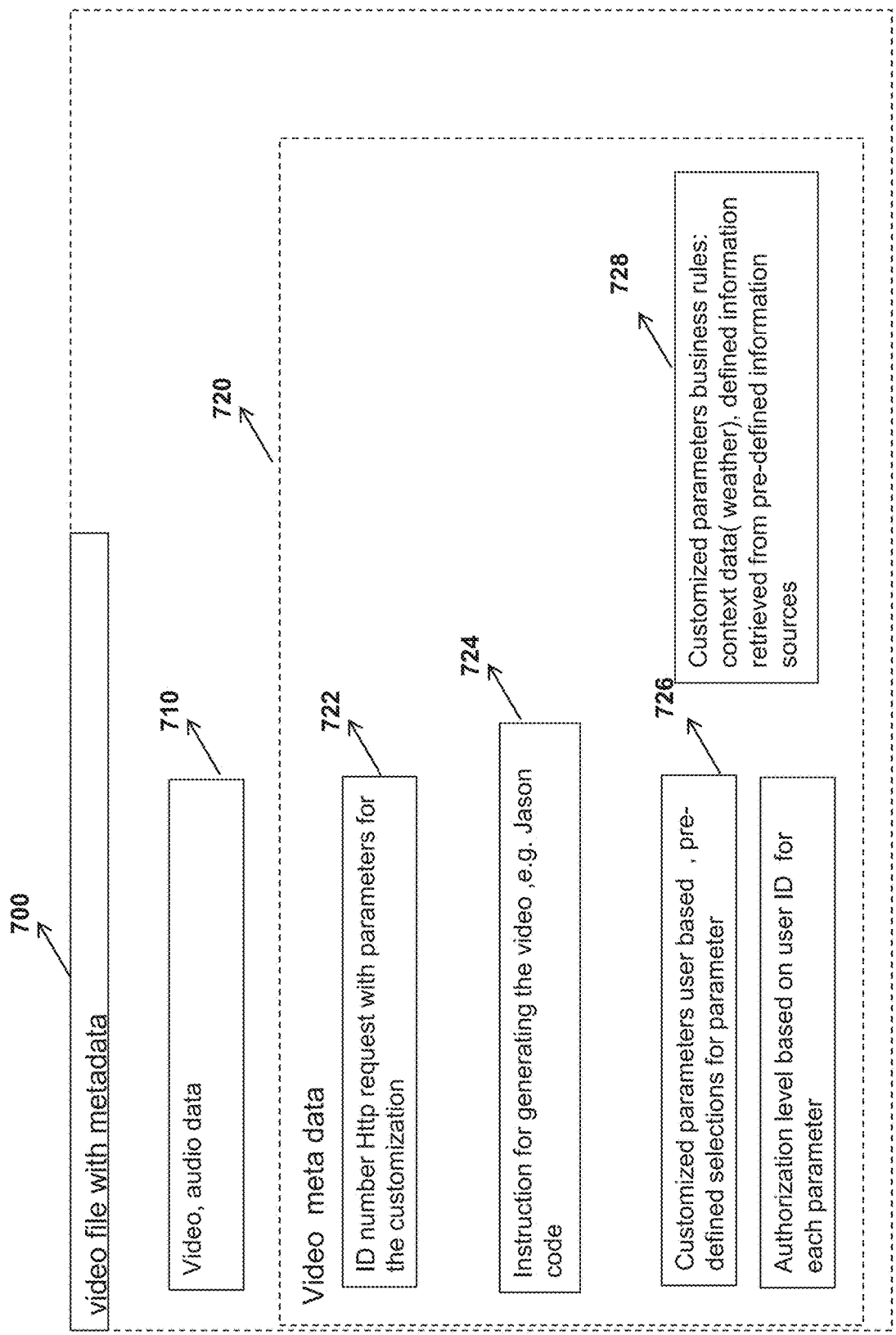
FIG. 2C is a block diagram depicting the video file format information structure, according to one embodiment of the invention.

FIG. 2C is a block diagram depicting the video file format information structure, according to one embodiment of the invention.

Figure 3:
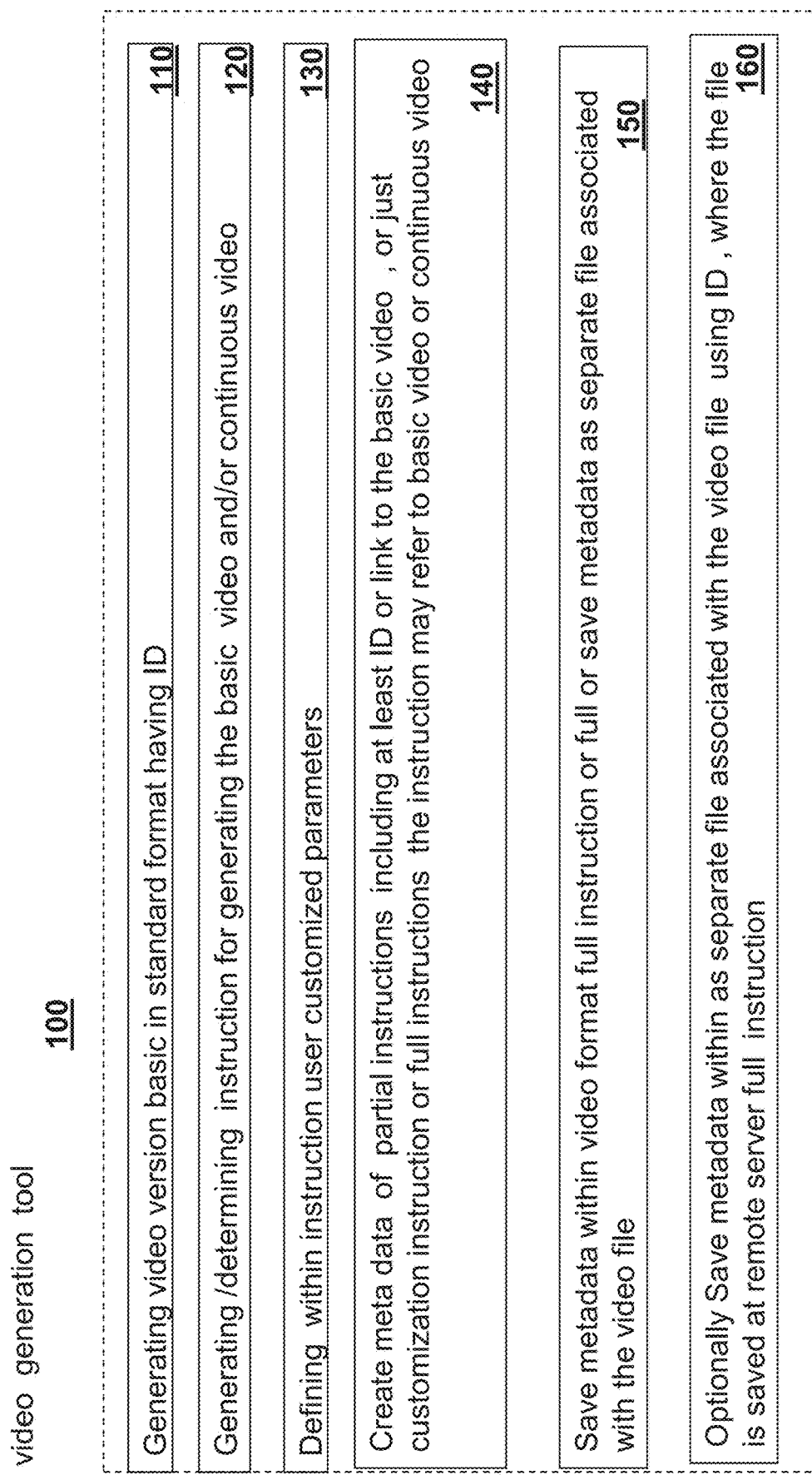
FIG. 3 is a flowchart depicting the video generation tool 100, according to some embodiments of the invention.

The video file format of digital media container 700 is comprised of video or audio data 710 and meta data 720. The meta data comprises at least video ID or a link of an HTTP request 722 and/or optionally partial or full video generation instructions 724 and/or customized parameters 726. Optionally according to embodiments the metadata comprise Customized parameters business rules: context data(weather), defined information retrieved from pre-defined information sources 728. For example the information source may be databased of an organization associated with the basic video including data which is relevant to the generation of the video, such as available type of products or services, which appear in the video. The context data may relate to sensor data available FIG. 3 is a flowchart depicting the video generation tool 100, according to some embodiments of the invention.

The video generation is configured to implement, at least one of the followings steps:

Generating a basic original video version in standard format, Optionally in designated format (step 110);

Generating/determining instruction for generating the basic original video and/or continuous video (step 120), The generation instruction may include script of the video which define objects, their properties, script of video, layers order information The instruction code may be for instance, a JSON code for generating a video as described above. When using video templates, the instruction code may include be in a form of a template.

Defining within instruction user customized parameters configured to change video parts, replace image part of image layers with frame, audio or text, (step 130);

Create meta data of partial instructions including at least ID or link to the basic video, or just customization instruction or full instructions; (step 140);

Save metadata within video format or save metadata as separate file associated with the video file (step 150), the sperate file is saved at remote server such as the video generating server 500;

FIG. 4A is a flowchart depicting video playing module checkup processing for web-based video, according to some embodiments of the invention.

The video playing module is configured to implement, at least one of the followings steps:

Check if metadata exists, if no, play the video; (step 210A)

If yes Read metadata from video file or associated info file; (step 220A)

Determining if to play the basic movie by checking meta data if any editing/refresh is required based on validation (expiration date) data, incase not requirement to for editing or refresh play the video otherwise do no play and apply the following steps; (step 230A)

If yes send meta data instruction to designated server; (step 240A)

Optionally upon reading meta data providing indication for the user or Prompting user to input interface for adding instruction parameters; (step 250A);

Optionally Receiving user input data; (step 260A)

Sending user input data with metadata of instruction code to video generating server; (step 270A)

Receiving back update/new version video; (step 280A)

Automatically Playing updated video version at the client device; (step 290A)

According to some embodiments of the present invention the steps 210, 220 230 are optional and video player automatically apply steps 240-290;

FIG. 4B is a flowchart depicting video playing module checkup processing for client-based video, according to some embodiments of the invention.

The video playing module is configured to implement, at least one of the followings steps:

Check if network available/server connected, if not play the video from client device storage; (step 210B)

Check if metadata exists, if not play the video; (step 220B)

If no Read metadata from video file or associated info file; (step 230B);

Determining if to play the basic movie by checking meta data if any editing/refresh is required validation (expiration date) data if no play the video; (step 240B)

If yes send meta data instruction to designated server; (step 250B)

Optionally on reading meta data providing indication for the user or Prompting user to input interface for adding instruction parameters; (step 260B)

Optionally Receiving user input data; (step 270B)

Sending user input data with metadata of instruction code to video generating server; (step 275B);

Receiving back updated video, updated video on local storage of client device; (step 280B);

Automatically playing updated video version; (step 290B)

FIG. 5 presents a flowchart, depicting the video generating server, according to some embodiments of the invention.

The video generating server is configured to implement, at least one of the followings steps:

Receive user customized data;

Receive instruction for generating video with user data; (step 310);

Optionally receiving only ID number and partial customized instructions, retrieving video generating instruction based on video ID, optionally full instructions, optionally information from external information sources(step 320);

Generating/selecting updated/new video version based on received instruction and user input data; (step 330). Optionally receiving instruction for locking the video for further editing.

Optionally Generating new continuous video based on received instruction and user input data and optionally creating a chain video including the generated updated/new video (from step 330) and the continuous video (step 340. Each user may create continuous new video part enabling to create chain video structure, where each new continuous video prolong the former video. This may used by group of users wishing to create happy birthday video which generated by the different users, each composing a greeting video. According to some embodiments of the present invention the updated video is based on external information source (such as weather data or stock market or any data based relevant for different user. Different source information may be used for each user.

Sending update new video version back to player; (step 350)

FIG. 5B presents a flowchart, depicting the video generating server, according to some embodiments of the invention.

The video generating server is configured to implement, at least one of the followings steps:

Receive user customized data (step 310B);

receiving video container only ID number or link and retrieving video generating instruction based on video ID (step 320B);

Generating/selecting updated/new video version based on received instruction and user input data(step 330B);

Sending updated/new video back to player (step 340B).

FIG. 5C presents a flowchart, depicting the video generating server, according to some embodiments of the invention.

The video generating server is configured to implement, at least one of the followings steps:

Receive user customized data;

receiving video metaset/container only with HTTP link with customized parameters and retrieving video generating instruction using link; (step 810);

Generating/selecting movie based on received instruction and user input data; (step 820);

Sending updated/new video back to player(step 830).

FIG. 6 presents a flowchart, depicting the video management module, according to some embodiments of the invention.

Save new created video as succeeding video version of the original video, create hierarchical tree association between original video and successive video created based on the original video(910);

maintaining associations between original video or version video by organizing the metadata in hierarchal tree structure maintaining correlation between the different version of the video file(920);

According to some embodiments of the present invention the original video and each new version are registered with unique ID which authenticate author/creator or editor of the video the unique ID may be using blockchain technology (930);

According to some embodiments of the present invention, the ID which authenticate author/creator or editor of the video the unique ID is created by implementing blockchain technology may store unique ID of the "father" of the video hierarchical tree(940);

Optionally according to some embodiments of the present invention the new version override the original video, maintaining only one version(950);

Optionally according to some embodiments of the present invention when generating new version the new version is a non editable version (960);

FIG. 7 illustrates an example of video file and Info file according to some embodiments of the present invention.

The video 60 file include video compressed data in know format, such MP4 and an info file including instruction data for generating the video: including Storyboard API or Scene API, Cache directive: expiration data, Unlocked customization parameters or monetizing parameters.

According to some embodiments of the present invention support sponsoring or monetizing the usage of system, by charging the user for new generated video based on his preferences and customization.

FIG. 8 illustrates an example of video screenshot and user interface according to some embodiments of the present invention.

In this example is shown promotion video, for a company name: Idomoo, the viewer of the video may request to generate a new version video based on this video, by changing the name of the company, the promotion message and the background image as shown in the interface 72.

FIG. 9A 9B illustrates an example metadata including instruction code and or parameters according to some embodiments of the present invention According to some embodiments of the present invention it is possible to generate continuous video for the basic video, the continuous video may include the same and or different images, audio, video parts and customized/personalized parameters. The continuous video is added to basic video creating new longer video, a chain video.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for generating video variation to original basic videos, implemented by one or more processors operatively coupled to a non-transitory computer readable storage device, on which are stored modules of instruction code that when executed cause the one or more processors to perform the steps of:

creating an original video file, associated with metadata relevant to said original file which includes at least partial information to generate a new variation video file including at least one parameter configured to change or add to content of the original video file, wherein the metadata includes text, images, and video, and instruction of their movement and appearance throughout time together and with respect to each other;

wherein the metadata comprises customization parameters from external information sources including at least one of: updated/real-time context parameters and parameter data originated from pre-defined external information sources associated with the basic video;

wherein the information sources are databased of an organization associated with the basic video including data which is relevant to the generation of the video variation, including type of products or services, which appear in the video variation and sensor data available;

upon opening the original video file by a client player reading said associated metadata;

whenever refresh is not required based on the metadata, playing the basic video, wherein said predefined conditions include validation of the video file, and whenever refresh of the video is required based on the metadata, applying the following steps:

generating the video version according to the customization parameters and instruction data to change video parts, replace image part of image layers with frame, audio or text of the metadata including updated context parameters and data from the external information sources including the data which is relevant to the generation of the video variation, including the type of products or services, which appear in the video variation and the available sensor data, and the at least partial information, wherein the instruction data contains data that are essential for drawing blueprints for the scene, including: composition of what elements to draw and where/when/how they should be drawn, transformed or animated, text, images, and video and how they all move and appear throughout time together and with respect to each other;

sending back the generated video version to the client player;

and automatically playing received generated video version at the client player.

2. The method of claim 1 further comprising the steps of checking metadata predefined conditions for playing the video as is, said predefined conditions including at least one of existence of at least one parameter, validation of the video file, network availability.

3. The method of claim 1 further comprising the steps of: playing video as is whenever the video initial conditions are met.

4. The method of claim 1 wherein the video information is embedded as part of the metadata of the video file.

5. The method of claim 1 wherein the video information is recorded as separate file in association with the created video, further comprising the step of retrieving video generating instruction based on video ID.

6. The method of claim 1 wherein the partial video information includes a network link to the basic video at least partial information.

7. The method of claim 1 wherein the video information includes partial instruction for generating the video.

8. The method of claim 1 wherein the video information includes full instructions for generating the original or version of the video.

9. The method of claim 1 wherein video information is embedded as link of an HTTP request including customization parameters data, wherein generation of the video is further based on said of the customization parameters data.

10. The method of claim 1 further comprising the steps of saving at least one new created video as succeeding video version of the original video and creating hierarchical tree association between original video and successive video created based on the original video, where each version is associated to the user ID.

11. The method of claim 1 further comprising the steps maintaining associations between original video or version video by organizing the metadata in hierarchal tree structure maintaining correlation between the different version of the video file.

12. The method of claim 1 wherein the original video and each new version are registered with unique ID which authenticate author/creator or editor of the video the unique ID using blockchain technology.

13. The method of claim 1 further comprising:
enabling a user to change/select at least one predefined customization parameters data;
sending at least partial information with user selections to a remote server.

14. A system for customizing videos, implemented by one or more processors operatively coupled to a non-transitory computer readable storage device, which comprise the module of:
video generation tool configured for creating/determining original basic video associated with metadata relevant to said original file which includes at least partial information to generate the new video version, said at least partial information including at least one parameter configured to change or add to the video content, wherein the metadata includes text, images, and video, and instruction of their movement and appearance throughout time together and with respect to each other;
wherein the metadata comprises customization parameters from external information sources including updated/real-time context parameters and parameter data originated from pre-defined external information sources associated with the basic video;
wherein the information sources are databased of an organization associated with the basic video including data which is relevant to the generation of the video variation, including type of products or services, which appear in the video variation and sensor data available;
video player configured to read the metadata upon opening the original video file by a client, and, whenever refresh is not required based on the metadata, to play the original basic video;
wherein said predefined conditions include validation of the video file;
the remote server, configured for generating new video version whenever refresh of the video is required based on the metadata, according to the customization parameters and instruction data to change video parts, replace image part of image layers with frame, audio or text of the metadata including updated context parameters and data from the external information sources including the data which is relevant to the generation of the video variation, including the type of products or services, which appear in the video variation and the available sensor data, and the at least partial information, wherein the instructions data contains data that are essential for drawing blueprints for the scene, including:
composition of what elements to draw and where/when/how they should be drawn, transformed or animated, text, images, and video and how they all move and appear throughout time together and with respect to each other, wherein the remote server sends back the new video version to the video player;
wherein the video player sends video instructions to the remote server;
wherein the video player automatically plays the received new video version.

15. The system of claim 14 wherein the video generation module is further configured for checking metadata predefined conditions for playing the video as is, said predefined conditions including at least one of existence of metadata, validation of the video file, network availability and playing video as is in case the predefined conditions are met.

16. The system of claim 14 wherein the video information is embedded as part of the metadata of the video file.

17. The system of claim 14 wherein the video information is recorded as separate file in association with the created video.

18. The system of claim 14 wherein the video information includes full instructions for generating the basic video.

19. The system of claim 14 wherein the link is an HTTP request including customization parameters data, wherein generation of the video is further based on said of the customization parameters data.

* * * * *